(12) United States Patent
Jiang et al.

(10) Patent No.: US 12,143,667 B2
(45) Date of Patent: Nov. 12, 2024

(54) PANORAMA VIDEO EDITING METHOD, APPARATUS, DEVICE AND STORAGE MEDIUM

(71) Applicant: ARASHI VISION INC., Shenzhen (CN)

(72) Inventors: Wenjie Jiang, Shenzhen (CN); Pengwei Lyu, Shenzhen (CN); Jinlin Cai, Shenzhen (CN)

(73) Assignee: ARASHI VISION INC., Shenzhen (CN)

( * ) Notice: Subject to any disclaimer, the term of this patent is extended or adjusted under 35 U.S.C. 154(b) by 76 days.

(21) Appl. No.: 17/790,991

(22) PCT Filed: Jan. 7, 2021

(86) PCT No.: PCT/CN2021/070702
§ 371 (c)(1),
(2) Date: Jul. 6, 2022

(87) PCT Pub. No.: WO2021/139731
PCT Pub. Date: Jul. 15, 2021

(65) Prior Publication Data
US 2023/0040548 A1 Feb. 9, 2023

(30) Foreign Application Priority Data
Jan. 7, 2020 (CN) .......................... 202010015747.X (51) Int. Cl.
*H04N 21/44* (2011.01)
*H04N 21/4402* (2011.01)

(52) U.S. Cl.
CPC ............. *H04N 21/44008* (2013.01); *H04N 21/440245* (2013.01); *H04N 21/440281* (2013.01)

(58) Field of Classification Search
CPC ..... H04N 21/44008; H04N 21/440245; H04N 21/440281
See application file for complete search history.

(56) References Cited

U.S. PATENT DOCUMENTS 10,142,540 B1   11/2018  Ribeiro et al.
10,147,191 B1 * 12/2018  Ribeiro ................ H04N 23/632
(Continued)

FOREIGN PATENT DOCUMENTS

CN    105847379 A    8/2016
CN    106358036 A    1/2017
CN    107633241 A    1/2018

*Primary Examiner* — Randy A Flynn
(74) *Attorney, Agent, or Firm* — XSENSUS LLP (57) ABSTRACT

The present invention is applicable to the technical field of panoramic videos. Provided are a panoramic video clip method, apparatus and device, and a storage medium. The method comprises acquiring a panoramic video photographed by means of a panoramic camera, and recording an advancing-direction viewing angle of the panoramic camera during moving photographing; carrying out a frame extraction operation on the acquired panoramic video to obtain a corresponding panoramic video frame, carrying out significant target detection on the panoramic video frame, tracking a detected significant target by using a preset target tracking algorithm, and acquiring a viewing angle at which the tracked significant target is located; and clipping the panoramic video according to the advancing-direction viewing angle and the viewing angle at which the significant target is located, so as to generate a target video corresponding to the panoramic video. A panoramic video is automatically clipped, and the fluency of transitions, and the effectiveness and the degree to which content in a target video is interesting are also ensured.

18 Claims, 2 Drawing Sheets

(56) References Cited

U.S. PATENT DOCUMENTS

| | | |
|---|---|---|
| 10,230,866 B1 * | 3/2019 | Townsend ............ H04N 1/2108 |
| 2017/0127008 A1 * | 5/2017 | Kankaanpää .... H04N 21/42204 |
| 2018/0115706 A1 * | 4/2018 | Kang ................... H04N 23/698 |
| 2018/0124316 A1 | 5/2018 | Kankaanpaa et al. |
| 2019/0007669 A1 | 1/2019 | Kim et al. |
| 2020/0051594 A1 * | 2/2020 | Yuan .................... G11B 27/031 |

* cited by examiner

PANORAMA VIDEO EDITING METHOD, APPARATUS, DEVICE AND STORAGE MEDIUM

TECHNICAL FIELD

The present application relates to the technical field of panoramic video, and in particular, relates to a method, apparatus, device and storage medium for editing panoramic video.

BACKGROUND

Panoramic video is a video shot by a panoramic camera in all-round 360 degrees, and users can watch the dynamic video in the shooting angle range of the panoramic camera at will. When watching the panoramic video, the flat panel display can only display images at one viewing angle of the panoramic video at a certain moment. Therefore, when the user wants to watch a certain salient object in a certain period of time during the playing of the panoramic video, the display needs to be constantly controlled to rotate the viewing angle because the object may be invisible at the current viewing angle, which makes the operation troublesome and influences the viewing experience.

SUMMARY

In an aspect, an embodiment of the present application discloses a panoramic video editing method. The panoramic video editing method includes the following steps:

acquiring a panoramic video shot by a panoramic camera, and recording a viewing angle at a forward direction of the panoramic camera in the process of moving for shooting;

performing frame extraction operation on the acquired panoramic video to obtain corresponding panoramic video frames, performing salient object detection on the panoramic video frames, tracking the detected salient object by a preset object tracking algorithm, and acquiring a viewing angle of the tracked salient object;

according to the viewing angle at the forward direction and the viewing angle of the salient object, editing the panoramic video to generate an object video corresponding to the panoramic video.

Optionally, the step of recording the viewing angle at a forward direction of the panoramic camera in the process of moving for shoot includes:

acquiring the forward direction of the panoramic camera which is moving for shooting according to the panoramic video, and acquiring lens images corresponding to the viewing angle at the forward direction, wherein the panoramic video is an original spherical video.

Optionally, the steps of performing frame extraction operation on the acquired panoramic video to obtain corresponding panoramic video frames, performing salient object detection on the panoramic video frames in sequence, tracking the detected salient object by a preset object tracking algorithm, and acquiring a viewing angle of the tracked salient object includes:

performing frame extraction operation on the panoramic video to obtain corresponding panoramic video frames, and performing salient object detection on the panoramic video frames;

in response to the current salient object is detected in the currently detected panoramic video frame, tracking the current salient object sequentially in the subsequent panoramic video frames by the preset object tracking algorithm and acquiring the viewing angle of the current salient object.

Optionally, after the step of obtaining the viewing angle of the current salient object, the method further includes:

detecting a tracking stop event for the current salient object, and in response to the tracking stop event for the current salient object is detected, jumping to the step of performing frame extraction operation on the panoramic video to continue the salient object detection.

Optionally, the step of performing salient object detection on the panoramic video frames includes:

in response to a preset object category is detected in the currently detected panoramic video frame, setting an object with the largest saliency value as the current salient object of the currently detected panoramic video frame.

Optionally, the step of tracking the current salient object sequentially in the subsequent panoramic video frames by the preset object tracking algorithm and acquiring the viewing angle of the current salient object comprises:

acquiring center coordinates of a tracking box of the current salient object in the currently detected panoramic video frame, and calculating spherical viewpoint coordinates of the current salient object according to the center coordinates;

acquiring lens images corresponding to the viewing angle of the salient object according to the spherical viewpoint coordinates.

Optionally, the tracking stop event is that the current salient object is lost or the area of the tracking box is smaller than a preset area.

Optionally, the step of editing the panoramic video to generate an object video corresponding to the panoramic video, according to the viewing angle at the forward direction and the viewing angle of the salient object includes:

traversing the panoramic video frames of the panoramic video frames, and in response to the panoramic video frames without salient object, editing lens images corresponding to the viewing angle at the forward direction in the panoramic video frames, and setting a playing speed of the lens images;

in response to the panoramic frames with the salient object, determining to edit lens images of the corresponding viewing angle in the panoramic video frames according to the number of frames in which each salient object is detected, and setting the playing speed of the lens images;

generating an object video corresponding to the panoramic video according to the edited lens images and the corresponding playing speed that is set.

Optionally, the step of determining to edit lens images of the viewing angle of each salient object in the panoramic video frames according to the number of frames in which each salient object is detected, and setting the playing speed of the lens images includes:

determining the number of frames in which each salient object is continuously tracked, and in response to the number of frames is less than a set threshold, editing lens images corresponding to the viewing angle at the forward direction in the panoramic video frames, and setting the playing speed of the lens images to be fast playing;

in response to the number of frames is greater than the set threshold, editing lens images corresponding to the transition from the viewing angle at the forward direction to the viewing angle of the salient object in the panoramic video frames in a first time period, setting the playing speed of the lens images to be fast playing, editing lens images corresponding to the viewing angle of the salient object in the panoramic video frames in a second time period, setting the playing speed of the lens images to be slow playing, editing lens images corresponding to the transition from the viewing angle of the salient object to the viewing angle at the forward direction in the panoramic video frames in a third time period, and setting the playing speed of the lens images to be fast playing.

In another aspect, an embodiment of the present application further discloses a panoramic video editing device. The panoramic video editing device includes: a memory, a processor, and a computer program stored in the memory and executable on the processor, and the computer program, when executed by the processor, enables the processor to execute steps of the method as described above.

In another aspect, an embodiment of the present application further discloses a computer-readable storage medium storing a computer program, and the computer program, when executed by the processor, executes steps of the method as described above.

DETAILED DESCRIPTION

In order to make objectives, technical solutions and advantages of the present application clearer, the present application will be further described in detail below with reference to attached drawings and embodiments. It shall be appreciated that, the specific embodiments described here are only used to explain the present application, and are not intended to limit the present application.

The specific implementation of the present application will be described in detail below with reference to specific embodiments.

First Embodiment

Figure 1:
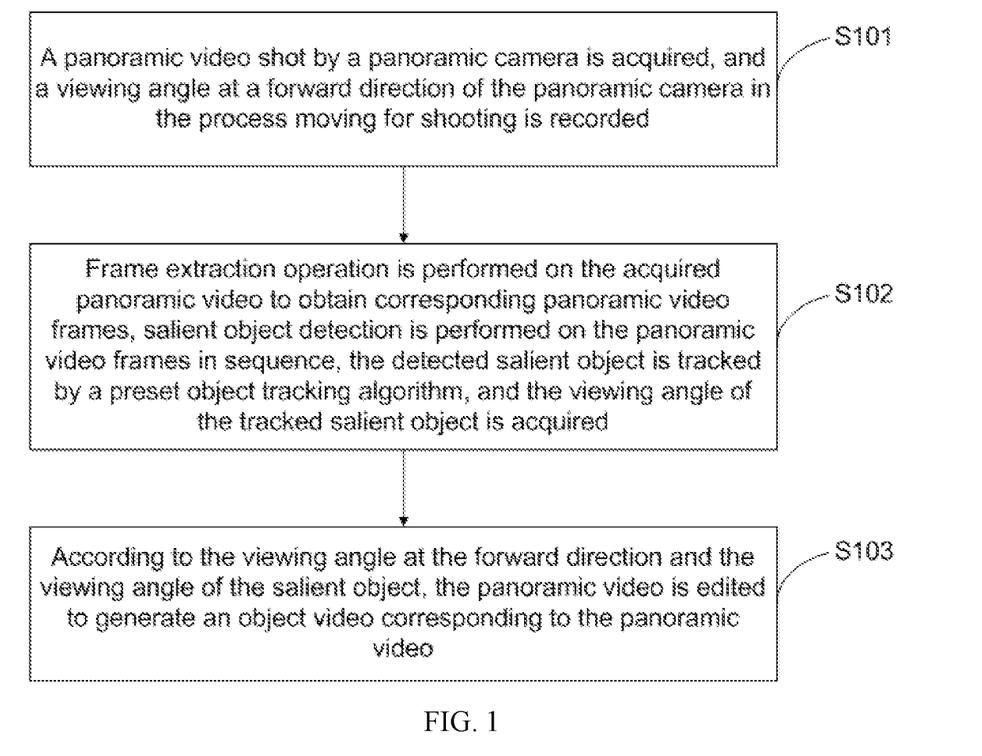
FIG. 1 is a flowchart diagram for implementing a panoramic video editing method according to a first embodiment of the present application.

FIG. 1 shows a flowchart diagram for implementing a panoramic video editing method according to the first embodiment of the present application. The panoramic video editing method according to the embodiment of the present application may be applied to computing equipment, which may be but not limited to various personal computers, notebook computers, smart phones, tablet computers and panoramic cameras.

For convenience of description, FIG. 1 only shows parts related to the embodiment of the present application, which are detailed as follows.

In step S101, a panoramic video shot by a panoramic camera is acquired, and a viewing angle at a forward direction of the panoramic camera in the process of moving for shooting is recorded.

The embodiment of the present application is applicable to panoramic video edition and is used for editing panoramic video. The panoramic video is shot by a panoramic camera which is composed of two or more fisheye lenses, and the panoramic video is an original spherical video. The operation of recording the viewing angle at the forward direction of the panoramic camera during shooting specifically includes: acquiring the forward direction of the panoramic camera which is moving for shooting according to the panoramic video, and then acquiring lens images corresponding to the viewing angle at the forward direction, thereby the viewing angle at the forward direction of the panoramic camera can be recorded by means of recording the lens images corresponding to the viewing angle at the forward direction.

In step S102, frame extraction operation is performed on the acquired panoramic video to obtain corresponding panoramic video frames, salient object detection is performed on the panoramic video frames in sequence, the detected salient object is tracked by a preset object tracking algorithm, and the viewing angle of the tracked salient object is acquired.

In the embodiment of the present application, the operation of performing frame extraction on the acquired panoramic video at preset time intervals to obtain corresponding panoramic video frames, performing salient object detection on the panoramic video frames in sequence, tracking the detected salient object by a preset object tracking algorithm, and acquiring the viewing angle of the tracked salient object can be implemented by the following steps:

(1) performing frame extraction operation on the panoramic video to obtain corresponding panoramic video frames, and performing salient object detection on the panoramic video frames.

In the embodiment of the present application, when salient object detection is performed on panoramic video frames and salient objects under the preset object category are detected in the currently detected panoramic video frame, the object with the largest saliency value is set as the current salient object of the currently detected panoramic video frame, so that the salient object to be tracked in the currently detected panoramic video frame is accurately acquired when multiple salient objects are detected. When the salient object under the object category cannot be detected in the currently detected panoramic video frame, it is determined that there is no salient object in the currently detected panoramic video frame. The object category may be set according to preset shooting scenes of the panoramic camera to further improve the accuracy of object detection. For example, the object category may include sculptures, stone tablets, flower beds and landmark buildings, and salient objects under the category of sculptures may include animal sculptures, plant sculptures and human sculptures or the like. Specifically, when salient object detection is performed on panoramic video frames, algorithms including but not limited to a Frequency-tuned Salient Region Detection (FT) algorithm or superpixel convolutional neural networks (for example, A Superpixelwise Convolutional Neural Network for Salient Object Detection) may be adopted so as to improve the accuracy of object detection and ensure the stability of object detection.

(2) tracking the current salient object in the subsequent panoramic video frames in sequence by a preset object tracking algorithm, and acquiring the viewing angle of the current salient object when the current salient object is detected in the currently detected panoramic video frame.

In the embodiment of the present application, when the current salient object is detected in the currently detected panoramic video frame, the current salient object is tracked in the panoramic video frames subsequent to the frame in sequence by a preset object tracking algorithm, and the viewing angle of the current salient object is acquired. The object tracking algorithm may adopt algorithms which include but not limited to a High-speed Tracking with Kernelized Correlation filters (KCF) algorithm or an Accurate Scale Estimation for Robust Visual Tracking (DSST) algorithm or the like.

Specifically, in the operation of tracking the current salient object in the panoramic video frames subsequent to the frame in sequence by the preset object tracking algorithm, and acquiring the viewing angle of the current salient object, the area and center coordinates of the tracking box of the current salient object in the currently detected panoramic video frame are acquired, the spherical viewpoint coordinates of the current salient object are calculated according to the center coordinates, and lens images corresponding to the viewing angle of the salient object are acquired according to the spherical viewpoint coordinates, thereby simplifying the way for recording the viewing angle of the salient object and improving the accuracy when acquiring the viewing angle of the salient object.

In the embodiment of the present application, when the viewing angle of the tracked salient object is acquired, a tracking stop event for the current salient object is detected, and when the tracking stop event for the current salient object is detected, the method jumps to the step (1) to continue the salient object detection.

In the embodiment of the present application, when the tracking stop event for the current salient object is detected in the object tracking process of a panoramic video frame subsequent to the currently detected panoramic video frame, the method jumps to step (1) to continue the salient object detection. That is, the salient object detection is performed on the subsequent panoramic video frame, and then the subsequent panoramic video frame becomes the currently detected panoramic video frame, and so on, thereby realizing object detection and tracking for all the panoramic video frames. The tracking stop event is that the current salient object is lost, or the area of the tracking box is smaller than the preset area, which is used to accurately determine whether to stop the object tracking.

In step S103, according to the viewing angle at the forward direction and the viewing angle of the salient object, the panoramic video is edited to generate an object video corresponding to the panoramic video.

In the embodiment of the present application, after acquiring or recording the viewing angle at the forward direction and the viewing angle of the salient object in the extracted panoramic video frames, in order to generate the object video corresponding to the panoramic video, the panoramic video frames are traversed. In response to the traversed panoramic video frames without salient object, lens images corresponding to the viewing angle at the forward direction in the panoramic video frames are edited, and the playing speed of the lens images is set. In response to the panoramic video frames with the salient object, it is determined to edit the lens images of the viewing angle of each salient object in the panoramic video frames according to the number of frames in which each salient object is tracked, and the playing speed of the lens images is set. The object video corresponding to the panoramic video is generated according to the edited lens images and the corresponding playing speed that is set, thereby realizing the automatic editing of the panoramic video, and ensuring the fluency of transition in the object video as well as the effectiveness and interest of the content. The object video is a single-viewing angle video or a flat video.

Preferably, in response to the traversed panoramic video frames without the salient object, the lens images corresponding to the viewing angle at the forward direction in the panoramic video frames are edited, and the playing speed of the lens images is set to be fast playing, thereby going to the content in which users are interested quickly and improving the effectiveness and interest of the content played in the panoramic video.

In order to further improve the fluency when playing the panoramic video and improve the effectiveness and interest of the content, in the operation of determining to edit the lens images of the corresponding viewing angle in the panoramic video frames according to the number of frames in which each salient object is tracked, and setting the playing speed of the lens images, it is preferable to determine the number of frames in which each salient object is continuously tracked. When the number of frames is less than the set threshold, the lens images corresponding to the viewing angle at the forward direction in the panoramic video frames are edited, and the playing speed of the lens images is set to be fast playing. When the number of frames is greater than the set threshold, lens images corresponding to the transition from the viewing angle at the forward direction to the viewing angle of the salient object in the panoramic video frames are edited in a first time period, the playing speed of the lens images is set to be fast playing, lens images corresponding to the viewing angle of the salient object in the panoramic video frames are edited in a second time period, the playing speed of the lens images is set to be slow playing, lens images corresponding to the transition from the viewing angle of the salient object to the viewing angle at the forward direction in the panoramic video frames are edited in a third time period, and the playing speed of the lens images is set to be fast playing. The first time period, the second time period, and the third time period are part of the time periods corresponding to the number of frames in which the salient object is continuously tracked. Preferably, the first time period, the second time period and the third time period are all ⅓ of the time periods corresponding to the number of frames in which the salient object is continuously tracked, thereby improving the effectiveness and interest of the content played in the panoramic video.

Second Embodiment

Figure 2:
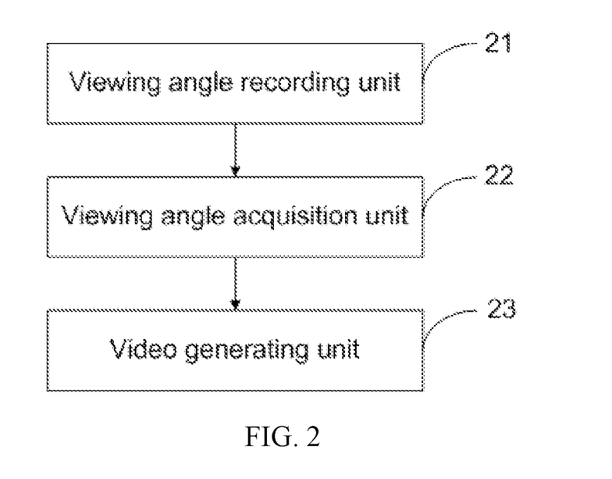
FIG. 2 is a schematic structural diagram of a panoramic video editing apparatus according to a second embodiment of the present application.

FIG. 2 shows the structure of a panoramic video editing apparatus according to the second embodiment of the present application. For convenience of description, only parts related to the embodiment of the present application are shown.

In the embodiment of the present application, the panoramic video editing apparatus includes a viewing angle recording unit 21, a viewing angle acquisition unit 22, and a video generating unit 23, wherein:

The viewing angle recording unit 21 is configured to acquire a panoramic video shot by a panoramic camera and record the viewing angle at the forward direction of the panoramic camera in the process of moving for shooting.

In the embodiment of the present application, the operation of recording the viewing angle at the forward direction of the panoramic camera in the process of moving for shooting, which is executed by the viewing angle recording unit 21 specifically includes: acquiring the forward direction of the panoramic camera which is moving for shooting according to the panoramic video, and then acquiring the lens images corresponding to the viewing angle at the forward direction, thereby the viewing angle at the forward direction of the panoramic camera can be recorded by means of recording the lens images corresponding to the viewing angle at the forward direction.

The viewing angle acquisition unit 22 is configured to perform frame extraction operation on the acquired panoramic video to obtain corresponding panoramic video frames, perform salient object detection on the panoramic video frames, track the detected salient object by a preset object tracking algorithm, and acquire the viewing angle of the tracked salient object.

The operation of performing frame extraction operation on the acquired panoramic video to obtain corresponding panoramic video frames, performing salient object detection on the panoramic video frames, tracking the detected salient object by a preset object tracking algorithm, and acquiring the viewing angle of the tracked salient object, which is executed by the viewing angle acquisition unit 22, includes the following steps:

(1) performing frame extraction operation on the panoramic video to obtain corresponding panoramic video frames, and performing salient object detection on the panoramic video frames.

In the embodiment of the present application, when salient object detection is performed on panoramic video frames and salient objects under the preset object category are detected in the currently detected panoramic video frame, the object with the largest saliency value is set as the current salient object of the currently detected panoramic video frame, so that the salient object to be tracked in the currently detected panoramic video frame is accurately acquired when multiple salient objects are detected. When the salient object under the object category cannot be detected in the currently detected panoramic video frame, it is determined that there is no salient object in the currently detected panoramic video frame. The object category may be set according to preset shooting scenes of the panoramic camera to further improve the accuracy of object detection.

(2) tracking the current salient object in the subsequent panoramic video frames in sequence by a preset object tracking algorithm, and acquiring the viewing angle of the current salient object when the current salient object is detected in the currently detected panoramic video frame.

In the embodiment of the present application, when the current salient object is detected in the currently detected panoramic video frame, the current salient object is tracked in the panoramic video frames subsequent to the frame in sequence by a preset object tracking algorithm, and the viewing angle of the current salient object is acquired. Specifically, during the operation of tracking the current salient object in the panoramic video frames subsequent to the frame in sequence by the preset object tracking algorithm, and acquiring the viewing angle of the current salient object, the area and center coordinates of the tracking box of the current salient object in the currently detected panoramic video frame are acquired, the spherical viewpoint coordinates of the current salient object are calculated according to the center coordinates, and lens images corresponding to the viewing angle of the salient object are acquired according to the spherical viewpoint coordinates, thereby simplifying the way for recording the viewing angle of the salient object.

In the embodiment of the present application, when the viewing angle of the tracked salient object is acquired, a tracking stop event for the current salient object is detected, and when the tracking stop event for the current salient object is detected, the method jumps to the step (1) to continue the salient object detection.

In the embodiment of the present application, when the tracking stop event for the current salient object is detected in the object tracking process of a panoramic video frame subsequent to the currently detected panoramic video frame, the method jumps to step (1) to continue the salient object detection. That is, the salient object detection is performed on the subsequent panoramic video frame, and then the subsequent panoramic video frame becomes the currently detected panoramic video frame, and so on, thereby realizing object detection and tracking for all the panoramic video frames. The tracking stop event is that the current salient object is lost, or the area of the tracking box is smaller than the preset area, which is used to accurately determine whether to stop the object tracking.

The video generating unit 23 is configured to edit the panoramic video to generate an object video corresponding to the panoramic video, according to the viewing angle at the forward direction and the viewing angle of the salient object.

In the embodiment of the present application, after acquiring or recording the viewing angle at the forward direction and the viewing angle of the salient object in the extracted panoramic video frames, in order to generate the object video corresponding to the panoramic video, the panoramic video frames are traversed. In response to the traversed panoramic video frames without the salient object, lens images corresponding to the viewing angle at the forward direction in the panoramic video frames are edited, and the playing speed of the lens images is set. In response to the panoramic video frames with the salient object, it is determined to edit the lens images of the viewing angle of each salient object in the panoramic video frames according to the number of frames in which each salient object is tracked, and the playing speed of the lens images is set. The object video corresponding to the panoramic video is generated according to the edited lens images and the corresponding playing speed that is set, thereby realizing the automatic editing of the panoramic video, and ensuring the fluency of transition in the object video as well as the effectiveness and interest of the content.

Preferably, in response to the panoramic video frames without the salient object, the lens images corresponding to the viewing angle at the forward direction in the panoramic video frames are edited, and the playing speed of the lens images is set to be fast playing, thereby going to the content in which users are interested quickly and improving the effectiveness and interest of the content played in the panoramic video.

In order to further improve the fluency when playing the panoramic video and improve the effectiveness and interest of the content, in the operation of determining to edit the lens images of the corresponding viewing angle in the panoramic video frames, according to the number of frames in which each salient object is tracked, and setting the playing speed of the lens images, it is preferable to determine the number of frames in which each salient object is continuously tracked. When the number of frames is less than the set threshold, the lens images corresponding to the viewing angle at the forward direction in the panoramic video frames are edited, and the playing speed of the lens images is set to be fast playing. When the number of frames is greater than the set threshold, lens images corresponding to the transition from the viewing angle at the forward direction to the viewing angle of the salient object in the panoramic video frames are edited in a first time period, the playing speed of the lens images is set to be fast playing, lens images corresponding to the viewing angle of the salient object in the panoramic video frames are edited in a second time period, the playing speed of the lens images is set to be slow playing, lens images corresponding to the transition from the viewing angle of the salient object to the viewing angle at the forward direction in the panoramic video frames are edited in a third time period, and the playing speed of the lens images is set to be fast playing.

In the embodiment of the present application, units of the panoramic video editing apparatus may be implemented by corresponding hardware or software units, and each of the units may be an independent software or hardware unit, or integrated into one software or hardware unit, and this is not intended to limit the present application.

Third Embodiment

Figure 3:
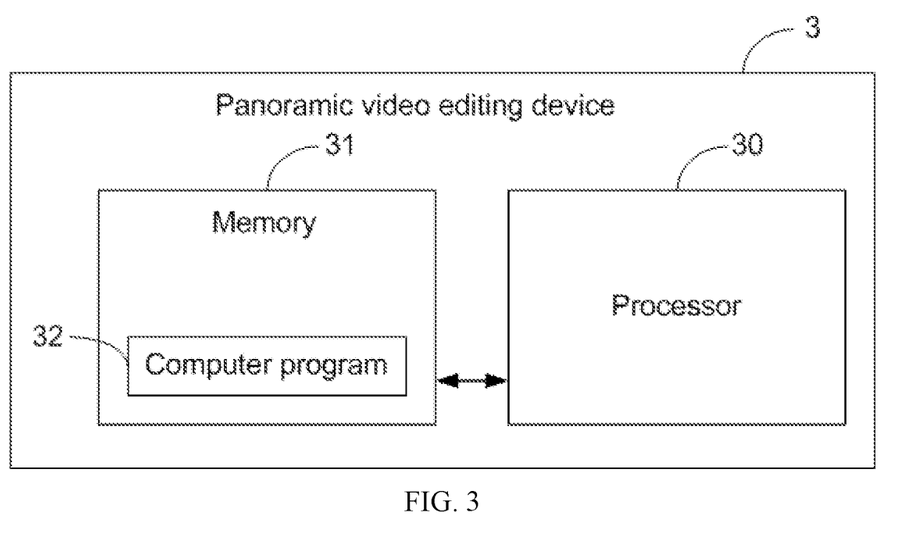
FIG. 3 is a schematic structural diagram of a panoramic video editing device according to a third embodiment of the present application.

FIG. 3 shows the structure of a panoramic video editing device according to the third embodiment of the present application, and for convenience of description, only parts related to the embodiment of the present application are shown.

The panoramic video editing device 3 according to the embodiment of the present application includes a processor 30, a memory 31, and a computer program 32 stored in the memory 31 and executable on the processor 30. The computer program 32, when executed by the processor 30, enables the processor 30 to execute the steps of panoramic video editing method according to the embodiments described above, such as steps S101 to S103 shown in FIG. 1. Alternatively, the computer program 32, when executed by the processor 30, enables the processor 30 to implement the functions of the units of the apparatus according to the embodiments described above, such as the functions of units 21 to 23 shown in FIG. 2.

According to the embodiments of the present application, after the panoramic video shot by the panoramic camera is acquired, the viewing angle at the forward direction of the panoramic camera in the process of moving for shooting is recorded, frame extraction operation is performed on the acquired panoramic video to obtain corresponding panoramic video frames, salient object detection is performed on the panoramic video frames in sequence, the detected salient object is tracked by a preset object tracking algorithm to acquire the viewing angle of the tracked salient object, and the panoramic video is edited to generate the object video corresponding to the panoramic video, according to the viewing angle at the forward direction and the viewing angle of the salient object. In this way, the automatic editing for the panoramic video is realized, and meanwhile, the fluency of the transition in the object video as well as the effectiveness and interest of the content are ensured.

The panoramic video editing device of the embodiment of the present application may be a smart phone, a personal computer, or a panoramic camera itself or the like. In the panoramic video editing device 3, reference may be made to the description of the embodiments of the method described above for steps of the panoramic video editing method executed by the processor 30 through executing the computer program 32, and this will not be further described herein.

Fourth Embodiment

In the embodiment of the present application, a computer-readable storage medium is disclosed. The computer-readable storage medium stores a computer program. The computer program, when executed by a processor, enables the processor to execute the steps of the panoramic video editing method according to the embodiments described above, such as steps S101 to S103 shown in FIG. 1. Alternatively, the computer program, when executed by the processor, implements the functions of the units of the device according to the embodiments described above, such as the functions of units 21 to 23 shown in FIG. 2.

According to the embodiments of the present application, after the panoramic video shot by the panoramic camera is acquired, the viewing angle at the forward direction of the panoramic camera in the process of moving for shooting is recorded, frame extraction operation is performed on the acquired panoramic video to obtain corresponding panoramic video frames, salient object detection is performed on the panoramic video frames in sequence, the detected salient object is tracked by a preset object tracking algorithm to acquire the viewing angle of the tracked salient object, the panoramic video is edited to generate the object video corresponding to the panoramic video, according to the viewing angle at the forward direction and the viewing angle of the salient object. In this way, the automatic editing for the panoramic video is realized, and meanwhile, the fluency of the transition in the object video as well as the effectiveness and interest of the content are ensured.

The computer-readable storage medium of the embodiment of the present application may include any entity or device, recording medium capable of carrying computer program code, such as a ROM/RAM, a magnetic disk, an optical disk, a flash memory and other memories.

What described above are only preferred embodiments of the present application, and are not intended to limit the present application. Any modification, equivalent substitution and improvement or the like made within the spirit and principle of the present application shall fall within the scope claimed in the present application.

What is claimed is:

1. A panoramic video editing method, comprising:
   acquiring a panoramic video shot by a panoramic camera, and recording a viewing angle at a forward direction of the panoramic camera in the process of moving for shooting;
   performing frame extraction operation on the acquired panoramic video to obtain corresponding panoramic video frames, performing salient object detection on the panoramic video frames tracking the detected salient object by a preset object tracking algorithm, and acquiring a viewing angle of the tracked salient object;
   according to the viewing angle at the forward direction and the viewing angle of the salient object, editing the panoramic video to generate an object video corresponding to the panoramic video;
   wherein the step of according to the viewing angle at the forward direction and the viewing angle of salient object, editing the panoramic video to generate an object video corresponding to the panoramic video comprises:
   traversing the panoramic video frames of the panoramic video, and in response to the panoramic video frames without salient object, editing lens images corresponding to the viewing angle at the forward direction in the panoramic video frames, and setting a playing speed of the lens images,
   in response to the panoramic video frames with the salient object, determining to edit lens images of the viewing angle of each salient object in the panoramic video frames according to the number of frames in which each salient object is detected, and setting the playing speed of the lens images, wherein the step of determining to edit lens images of the viewing angle of each salient object in the panoramic video frames according to the number of frames in which each salient object is detected, and setting the playing speed of the lens images comprises:

determining a number of frames in which each salient object is continuously tracked, and in response to the number of frames is less than a set threshold, editing lens images corresponding to the viewing angle at the forward direction in the panoramic video frames, and setting the playing speed of the lens images to be fast playing;

in response to the number of frames is greater than the set threshold, editing lens images corresponding to the transition from the viewing angle at the forward direction to the viewing angle of the salient object in the panoramic video frames in a first time period, setting the playing speed of the lens images to be fast playing, editing lens images corresponding to the viewing angle of the salient object in the panoramic video frames in a second time period, setting the playing speed of the lens images to be slow playing, editing lens images corresponding to the transition from the viewing angle of the salient object to the viewing angle at the forward direction in the panoramic video frames in a third time period, and setting the playing speed of the lens images to be fast playing;

generating an object video corresponding to the panoramic video according to the edited lens images and the corresponding playing speed that is set.

2. The panoramic video editing method according to claim 1, wherein the step of recording a viewing angle at a forward direction of the panoramic camera in the process of moving for shooting comprises:

acquiring the forward direction of the panoramic camera which is moving for shooting according to the panoramic video, and acquiring lens images corresponding to the viewing angle at the forward direction, wherein the panoramic video is an original spherical video.

3. The panoramic video editing method according to claim 1, wherein the steps of performing frame extraction operation on the acquired panoramic video to obtain corresponding panoramic video frames, performing salient object detection on the panoramic video frames, tracking the detected salient object by a preset object tracking algorithm, and acquiring a viewing angle of the tracked salient object comprises:

performing frame extraction operation on the panoramic video to obtain corresponding panoramic video frames, and performing salient object detection on the panoramic video frames;

in response to the current salient object is detected in the currently detected panoramic video frame, tracking the current salient object sequentially in the subsequent panoramic video frames by the preset object tracking algorithm and acquiring the viewing angle of the current salient object.

4. The panoramic video editing method according to claim 3, wherein after the step of acquiring the viewing angle of the current salient object, the method further comprises:

detecting a tracking stop event for the current salient object, and in response to the tracking stop event for the current salient object is detected, jumping to the step of performing frame extraction operation on the panoramic video to continue the salient object detection.

5. The panoramic video editing method according to claim 3, wherein the step of performing salient object detection on the panoramic video frames comprises:

in response to a preset object category is detected in a currently detected panoramic video frame, setting an object with the largest saliency value as the current salient object of the currently detected panoramic video frame.

6. The panoramic video editing method according to claim 3, wherein the step of tracking the current salient object sequentially in the subsequent panoramic video frames by the preset object tracking algorithm and acquiring the viewing angle of the current salient object comprises:

acquiring center coordinates of a tracking box of the current salient object in the currently detected panoramic video frame, and calculating spherical viewpoint coordinates of the current salient object according to the center coordinates;

acquiring lens images corresponding to the viewing angle of the salient object according to the spherical viewpoint coordinates.

7. The panoramic video editing method according to claim 6, wherein the tracking stop event is that the current salient object is lost or the area of the tracking box is smaller than a preset area.

8. The panoramic video editing method according to claim 1, wherein the step of determining to edit lens images of the viewing angle of each salient object in the panoramic video frames according to the number of frames in which each salient object is detected, and setting the playing speed of the lens images comprises:

wherein the first time period, the second time period and the third time period are all ⅓ of the time periods corresponding to the number of frames in which the salient object is continuously tracked.

9. A panoramic video editing device, comprising a memory, a processor, and a computer program stored in the memory and executable on the processor, wherein the computer program, when executed by the processor, enabling the processor to execute a panoramic video editing method;

wherein the panoramic video editing method comprises:

acquiring a panoramic video shot by a panoramic camera, and recording a viewing angle at a forward direction of the panoramic camera in the process of moving for shooting;

performing frame extraction operation on the acquired panoramic video to obtain corresponding panoramic video frames, performing salient object detection on the panoramic video frames tracking the detected salient object by a preset object tracking algorithm, and acquiring a viewing angle of the tracked salient object;

according to the viewing angle at the forward direction and the viewing angle of the salient object, editing the panoramic video to generate an object video corresponding to the panoramic video;

wherein the step of according to the viewing angle at the forward direction and the viewing angle of salient object, editing the panoramic video to generate an object video corresponding to the panoramic video comprises:
- traversing the panoramic video frames of the panoramic video, and in response to the panoramic video frames without salient object, editing lens images corresponding to the viewing angle at the forward direction in the panoramic video frames, and setting a playing speed of the lens images;
- in response to the panoramic video frames with the salient object, determining to edit lens images of the viewing angle of each salient object in the panoramic video frames according to the number of frames in which each salient object is detected, and setting the playing speed of the lens images,
- wherein the step of determining to edit lens images of the viewing angle of each salient object in the panoramic video frames according to the number of frames in which each salient object is detected, and setting the playing speed of the lens images comprises;
  - determining a number of frames in which each salient object is continuously tracked, and
  - in response to the number of frames is less than a set threshold,
    - editing lens images corresponding to the viewing angle at the forward direction in the panoramic video frames, and setting the playing speed of the lens images to be fast playing;
  - in response to the number of frames is greater than the set threshold,
    - editing lens images corresponding to the transition from the viewing angle at the forward direction to the viewing angle of the salient object in the panoramic video frames in a first time period, setting the playing speed of the lens images to be fast playing,
    - editing lens images corresponding to the viewing angle of the salient object in the panoramic video frames in a second time period, setting the playing speed of the lens images to be slow playing,
    - editing lens images corresponding to the transition from the viewing angle of the salient object to the viewing angle at the forward direction in the panoramic video frames in a third time period, and setting the playing speed of the lens images to be fast playing;
- generating an object video corresponding to the panoramic video according to the edited lens images and the corresponding playing speed that is set.

10. The panoramic video editing device according to claim 9, wherein the step of recording a viewing angle at a forward direction of the panoramic camera in the process of moving for shooting comprises:
- acquiring the forward direction of the panoramic camera which is moving for shooting according to the panoramic video, and acquiring lens images corresponding to the viewing angle at the forward direction, wherein the panoramic video is an original spherical video.

11. The panoramic video editing device according to claim 9, wherein the steps of performing frame extraction operation on the acquired panoramic video to obtain corresponding panoramic video frames, performing salient object detection on the panoramic video frames, tracking the detected salient object by a preset object tracking algorithm, and acquiring a viewing angle of the tracked salient object comprises:
- performing frame extraction operation on the panoramic video to obtain corresponding panoramic video frames, and performing salient object detection on the panoramic video frames;
- in response to the current salient object is detected in the currently detected panoramic video frame, tracking the current salient object sequentially in the subsequent panoramic video frames by the preset object tracking algorithm and acquiring the viewing angle of the current salient object.

12. The panoramic video editing device according to claim 11, wherein after the step of acquiring the viewing angle of the current salient object, the method further comprises:
- detecting a tracking stop event for the current salient object, and
- in response to the tracking stop event for the current salient object is detected, jumping to the step of performing frame extraction operation on the panoramic video to continue the salient object detection.

13. The panoramic video editing device according to claim 11, wherein the step of performing salient object detection on the panoramic video frames comprises:
- in response to a preset object category is detected in a currently detected panoramic video frame, setting an object with the largest saliency value as the current salient object of the currently detected panoramic video frame.

14. The panoramic video editing device according to claim 11, wherein the step of tracking the current salient object sequentially in the subsequent panoramic video frames by the preset object tracking algorithm and acquiring the viewing angle of the current salient object comprises:
- acquiring center coordinates of a tracking box of the current salient object in the currently detected panoramic video frame, and calculating spherical viewpoint coordinates of the current salient object according to the center coordinates;
- acquiring lens images corresponding to the viewing angle of the salient object according to the spherical viewpoint coordinates.

15. The panoramic video editing device according to claim 14, wherein the tracking stop event is that the current salient object is lost or the area of the tracking box is smaller than a preset area.

16. The panoramic video editing device according to claim 9, wherein the step of determining to edit lens images of the viewing angle of each salient object in the panoramic video frames according to the number of frames in which each salient object is detected, and setting the playing speed of the lens images comprises:
- wherein the first time period, the second time period and the third time period are all ⅓ of the time periods corresponding to the number of frames in which the salient object is continuously tracked.

17. A non-transitory computer-readable storage medium storing a computer program, wherein the computer program, when executed by the processor, executes a panoramic video editing method;
- wherein the panoramic video editing method comprises:

acquiring a panoramic video shot by a panoramic camera, and recording a viewing angle at a forward direction of the panoramic camera in the process of moving for shooting;

performing frame extraction operation on the acquired panoramic video to obtain corresponding panoramic video frames, performing salient object detection on the panoramic video frames tracking the detected salient object by a preset object tracking algorithm, and acquiring a viewing angle of the tracked salient object;

according to the viewing angle at the forward direction and the viewing angle of the salient object, editing the panoramic video to generate an object video corresponding to the panoramic video;

wherein the step of according to the viewing angle at the forward direction and the viewing angle of salient object, editing the panoramic video to generate an object video corresponding to the panoramic video comprises:

traversing the panoramic video frames of the panoramic video, and in response to the panoramic video frames without salient object, editing lens images corresponding to the viewing angle at the forward direction in the panoramic video frames, and setting a playing speed of the lens images;

in response to the panoramic video frames with the salient object, determining to edit lens images of the viewing angle of each salient object in the panoramic video frames according to the number of frames in which each salient object is detected, and setting the playing speed of the lens images,     wherein the step of determining to edit lens images of the viewing angle of each salient object in the panoramic video frames according to the number of frames in which each salient object is detected, and setting the playing speed of the lens images comprises:

determining a number of frames in which each salient object is continuously tracked, and         in response to the number of frames is less than a set threshold,         editing lens images corresponding to the viewing angle at the forward direction in the panoramic video frames, and setting the playing speed of the lens images to be fast playing;

in response to the number of frames is greater than the set threshold,         editing lens images corresponding to the transition from the viewing angle at the forward direction to the viewing angle of the salient object in the panoramic video frames in a first time period, setting the playing speed of the lens images to be fast playing,         editing lens images corresponding to the viewing angle of the salient object in the panoramic video frames in a second time period, setting the playing speed of the lens images to be slow playing,         editing lens images corresponding to the transition from the viewing angle of the salient object to the viewing angle at the forward direction in the panoramic video frames in a third time period, and setting the playing speed of the lens images to be fast playing;

generating an object video corresponding to the panoramic video according to the edited lens images and the corresponding playing speed that is set.

18. The non-transitory computer-readable storage medium according to claim 17, wherein the step of recording a viewing angle at a forward direction of the panoramic camera in the process of moving for shooting comprises:

acquiring the forward direction of the panoramic camera which is moving for shooting according to the panoramic video, and acquiring lens images corresponding to the viewing angle at the forward direction, wherein the panoramic video is an original spherical video.

* * * * *